(12) United States Patent
Xi et al.

(10) Patent No.: US 10,727,954 B2
(45) Date of Patent: *Jul. 28, 2020

(54) LONG DISTANCE SUBSEA CAN BUS DISTRIBUTION SYSTEM

(71) Applicant: Teledyne Instruments, Inc., Thousand Oaks, CA (US)

(72) Inventors: Huijiang Xi, Maitland, FL (US); Michael Greene, Palm Bay, FL (US); Don Heinz, Longwood, FL (US)

(73) Assignee: Teledyne Instruments, Inc., Thousand Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/182,555

(22) Filed: Jun. 14, 2016

(65) Prior Publication Data

US 2017/0359128 A1    Dec. 14, 2017

(51) Int. Cl.

| | |
|---|---|
| *H04B 10/50* | (2013.01) |
| *H04L 12/44* | (2006.01) |
| *H04L 12/40* | (2006.01) |
| *H04B 10/25* | (2013.01) |
| *H04B 10/278* | (2013.01) |
| *H04B 10/29* | (2013.01) |
| *H04B 13/02* | (2006.01) |
| *H04B 10/80* | (2013.01) |

(52) U.S. Cl.
CPC ......... *H04B 10/80* (2013.01); *H04B 10/2504* (2013.01); *H04B 10/278* (2013.01); *H04B 10/29* (2013.01); *H04B 13/02* (2013.01); *H04L 12/40* (2013.01); *H04L 12/40013* (2013.01); *H04L 12/44* (2013.01); *H04L 2012/40215* (2013.01)

(58) Field of Classification Search
CPC .... H04B 10/80; H04B 13/02; H04B 10/2504; H04B 10/29; H04B 10/278; H04L 12/40013; H04L 2012/40215; H04L 2/40
See application file for complete search history.

(56) References Cited

U.S. PATENT DOCUMENTS

| | | | | |
|---|---|---|---|---|
| 5,999,389 | A * | 12/1999 | Luebke | H04L 69/40 361/67 |
| 7,489,438 | B1 * | 2/2009 | Young | G02B 6/4448 359/333 |
| 9,057,846 | B2 * | 6/2015 | Xi | G02B 6/3816 |
| 9,203,640 | B2 * | 12/2015 | Xi | H04L 12/40 |
| 9,820,017 | B2 * | 11/2017 | Hunter | H04Q 9/00 |

(Continued)

FOREIGN PATENT DOCUMENTS

KR        100736771 B1 *   7/2007

*Primary Examiner* — Leslie C Pascal
(74) *Attorney, Agent, or Firm* — Duncan Galloway Egan Greenwald, PLLC; Kevin T. Duncan

(57) ABSTRACT

Messages on controller area network (CAN) buses are communicated over subsea links. Messages are sent as electrical or optical signals. The present invention provides a subsea CAN BUS electronic distribution unit (EDU) for transmitting, receiving, converting, and routing electrical or optical signals sent over a subsea CAN BUS network. The CAN BUS EDU of the present invention is contained within a single housing and combines the functions of transmitting, receiving, converting, and routing electrical or optical signals sent over a subsea CAN BUS network that would typically be handled by multiple devices.

18 Claims, 5 Drawing Sheets

(56) References Cited

U.S. PATENT DOCUMENTS

| | | | | |
|---|---|---|---|---|
| 9,979,491 B2* | 5/2018 | Greene | ............... | H04L 12/40 |
| 2005/0226625 A1* | 10/2005 | Wake | ............ | H04B 10/25753 |
| | | | | 398/115 |
| 2010/0183313 A1* | 7/2010 | Rhodes | ............. | H04B 13/02 |
| | | | | 398/104 |
| 2012/0175969 A1* | 7/2012 | Maughan | ............ | H01F 38/14 |
| | | | | 307/104 |
| 2012/0189302 A1* | 7/2012 | Yuki | ............. | H04B 10/272 |
| | | | | 398/36 |
| 2013/0044983 A1* | 2/2013 | Nagengast | ......... | E21B 33/0385 |
| | | | | 385/77 |
| 2014/0023365 A1* | 1/2014 | Xi | .................... | G02B 6/3816 |
| | | | | 398/58 |
| 2014/0093247 A1* | 4/2014 | Jamtveit | ............... | F16L 1/12 |
| | | | | 398/104 |

* cited by examiner

LONG DISTANCE SUBSEA CAN BUS DISTRIBUTION SYSTEM

FIELD OF THE INVENTION

The present invention relates to the field of communication buses and, in particular, to systems and methods for extending controller area network buses for long-distance subsea communication.

BACKGROUND

Subsea systems, such as those used in exploration and production of oil and gas, continue to increase in complexity. A subsea well can include sensors and actuators located at or below the sea floor. The sensors can be, for example, pressure sensors, temperature sensors, and erosion detectors. The actuators can be, for example, valves, pumps, and other flow control devices. Information from the sensors is commonly communicated with other subsea facilities and then communicated with or processed by equipment at a surface facility. Similarly, controls for the actuators commonly originate at a surface facility. Accordingly, communication is needed between the subsea devices and equipment at the surface.

In offshore drilling and production operations, equipment are often subjected to harsh conditions thousands of feet under the sea surface with working temperatures of −50° F. to 350° F. with pressures of up to 15,000 psi. Subsea control and monitoring equipment commonly are used in connection with operations concerning the flow of fluid, typically oil or gas, out of a well. Flow lines are connected between subsea wells and production facilities, such as a floating platform or a storage ship or barge. Subsea equipment include sensors and monitoring devices (such as pressure, temperature, corrosion, erosion, sand detection, flow rate, flow composition, valve and choke position feedback), and additional connection points for devices such as down hole pressure and temperature transducers. A typical control system monitors, measures, and responds based on sensor inputs and outputs control signals to control subsea devices. For example, a control system attached to a subsea tree controls down-hole safety valves. Functional and operational requirements of subsea equipment have become increasingly complex along with the sensing and monitoring equipment and control systems used to insure proper operation.

To connect the numerous and various sensing, monitoring and control equipment necessary to operate subsea equipment, harsh-environment connectors are used with electrical cables, optical fiber cables, or hybrid electro-optical cables. There exists a variety of wet-mate and dry-mate electrical and optical connectors that may be employed in subsea communication systems. In some known underwater electrical connectors, such as that described in U.S. Pat. Nos. 4,616,900; 4,682,848; 4,795,359; 5,194,012; 5,838,857; 6,315,461; 6,736,545; and 7,695,301, by Cairns, each of which is incorporated by reference herein in their entirety. Other known seal mechanisms involve some type of rotating seal element along with an actuator for rotating the seal element between a closed, sealed position when the units are unmated, and an open position when the units are mated, allowing the contact probes to pass through the seal elements into the contact chambers. Such connectors are described, for example, in U.S. Pat. Nos. 5,685,727 and 5,738,535 of Cairns, which are incorporated by reference herein in their entirety. The contacts on one side of a subsea or wet mateable electrical connector are typically in the form of pins or probes, while the contacts or junctions on the other side are in the form of sockets for receiving the probes. Typically, the socket contacts are contained in a sealed chamber containing a dielectric fluid or other mobile substance, and the probes enter the chamber via one or more sealed openings which include seals which exclude seawater and/or contaminants from the contact chamber in the mated and unmated conditions. Such electrical connectors are generally known as pin-and-socket type connectors. One example of an electrical underwater pin and socket connector is described in SEALED, FLUID-FILLED ELECTRICAL CONNECTOR, Cairns, U.S. Pat. No. 5,645,442, issued Jul. 8, 1997, and is sold by Teledyne ODI, Inc. of Daytona Beach, Fla. under the name Nautilus® and is incorporated by reference herein in its entirety.

To facilitate communication between these underwater devices, and between different communication mediums and network types, systems and control device are employed to manage the subsea equipment. Subsea communication may be implemented by fiber optic, electrical, or hybrid optical-electric communication systems. Fiber optic communication systems typically employ one or more optical fibers, while electrical communication systems employ copper wire which may be implemented as a twisted pair. Communication between devices and pieces of equipment may be on a TCP/IP network and may be handled by one or more modems, switches, routers, and control apparatuses.

Controller area network ("CAN") buses are used to interconnect sensors, actuators, controllers, and other devices in applications such as automobiles, industrial automation, and medical equipment. Many circuits and devices have been developed for CAN BUS communications. However, current CAN BUS based subsea systems face several limitations. Network size is restricted due to the impedance drop that results from connecting multiple electrical devices in parallel. Additionally, conventional driver components may not be suitable for long transmission lines. One system and method for controlling optical CAN BUS systems is described in SYSTEMS AND METHODS FOR SUBSEA OPTICAL CAN BUSES, Xi, U.S. Pat. No. 9,057,846, issued Jun. 16, 2015, and one cable that may be used in such a system is described in SUBSEA ELECTRO-OPTICAL CONNECTOR UNIT FOR ELECTRO-OPTICAL ETHERENET TRANSMISSION SYSTEM, Nagengast et al., U.S. Pat. No. 8,734,026, issued May 27, 2014, both of which are hereby incorporated by reference in their entirety.

In a typical subsea communication network having a plurality of wellheads a large subsea control module is employed to manage and facilitate communications between one or more subsea devices and other equipment on the surface over a CAN BUS network. The large subsea control module, which acts as the master device on the CAN BUS network, then manages communication between the surface and other subsea equipment such as wellheads, distribution units, and monitoring equipment over the CAN BUS network. The subsea control module, in some implementations, may also be configured to transform or convert signals from one form to another to facilitate communications between a plurality of subsea devices. For example, the subsea control module may be configured to convert optical input signals into electrical output signals or convert electrical input signals into optical output signals.

For most CAN BUS networks, multiple devices for managing optical CAN BUS signal transmission and for low to high speed CAN BUS conversion are needed to facilitate communication between all devices on the CAN BUS network. For example, an optical connection may be needed to provide a signal to devices a large distance away from the signal source, but these devices may only operate with an electrical signal input, so a conversion from optical to electrical may be needed. Currently, multiple devices must be used to first transmit the optical signal and then convert the optical signal to an electrical signal. Using multiple devices increases the number of failure points on the system and increases the cost and complexity associated with identifying and repairing a problem on the CAN BUS network. Additionally, placing the electronics and circuitry needed to perform these transmissions and conversions at the end points of the signal instead of in a single housing creates un-needed and undesirable redundancy and possible points of failure.

What is needed is a single device that combines optical CAN BUS and low to high speed signal conversion in a single housing.

SUMMARY

The present invention provides a system, method, and apparatus for subsea optical CAN BUS distribution and low speed to high speed signal conversion. The present invention provides for sending multiple CAN BUS signals long distances while making the overall system more reliable and less costly to repair.

The present invention may take the form of a flying lead harness or modular connectorized distribution unit housing (MCDU), such as that disclosed in MODULAR SECURING DEVICE FOR ROV AND DIVER MATE-ABLE SUBSEA APPLICATIONS, U.S. patent application Ser. No. 14/582,165, which is hereby incorporated by reference in its entirety, and may comprise at least one optical signal input and a plurality of electrical outputs.

For long step outs, placing the optical CAN BUS and low to high speed conversion in a single housing enables multiple CAN BUS signal types to be sent or distributed from a single hub. This removes the complex circuitry from the cable termination and places it in a single housing that is easier to retrieve and replace in the event that a problem occurs in the housing. Placing multiple CAN BUS types in a single housing is more reliable than placing the electronics in the same location as the cable termination or placing the electronics in separate housings. The present invention provides for a simple way to reduce the cost of subsea CAN BUS architecture networks that involve multiple long CAN BUS sensors or devices.

The distribution system of the present invention may also be used or combined with CAN BUS repeaters such as those described in LONG DISTANCE SUBSEA CAN BUS REPEATER CABLE, Huijiang Xi et al., U.S. Pat. No. 9,203,640, issued Dec. 1, 2015, to extend the range of the CAN BUS system, and with optical to electrical distribution hubs such as those described in SYSTEM, METHOD, AND APPARATUS FOR SUBSEA OPTICAL TO ELECTRICAL DISTRIBUTION, Michael Greene et al., U.S. patent application Ser. No. 15/069,644, filed Mar. 14, 2016, both of which are hereby incorporated by reference in their entirety. The distribution system of the claimed invention may also be used with other CAN BUS system components including existing optical cables, electrical cables, Ethernet cables, bulkhead and electrical penetrators, and other components typically used in CAN BUS networks.

In a first embodiment, the present invention provides a subsea CAN BUS electronic distribution unit comprising: a housing comprising an outer shell and an inner atmospheric chamber disposed within the outer shell adapted to withstand high temperature and pressure differentials; a set of control circuitry disposed within the inner atmospheric chamber; an optical CAN BUS transmitter/receiver disposed within the inner atmospheric chamber and connected to the set of control circuitry; an electrical CAN BUS transmitter/receiver disposed within the inner atmospheric chamber and connected to the set of control circuitry; a set of optical CAN BUS inputs and outputs connected to the optical CAN BUS transmitter/receiver; a set of electrical CAN BUS inputs and outputs connected to the electrical CAN BUS transmitter/receiver; wherein, the subsea CAN BUS electronic distribution unit is adapted to: receive an optical input signal at the set of optical CAN BUS inputs or an electrical input signal at the set of electrical CAN BUS inputs; determine, by a set of instructions stored on the control circuitry, which of the outputs in the set of optical CAN outputs and the set of electrical CAN outputs to transmit an output signal; and transmit the output signal.

The subsea CAN BUS electronic distribution unit of the above embodiment may further comprise: a low to high speed CAN BUS electrical signal converter disposed within the inner atmospheric chamber and connected to the set of control circuitry; a high to low speed CAN BUS electrical signal converter disposed within the inner atmospheric chamber and connected to the set of control circuitry; a set of high speed CAN BUS electrical inputs connected to the high to low speed CAN BUS electrical signal converter; a set of low speed CAN BUS electrical inputs connected to the low to high speed CAN BUS electrical signal converter; a set of high speed CAN BUS electrical outputs connected to the low to high speed CAN BUS electrical signal converter; a set of low speed CAN BUS electrical outputs connected to the high to low speed CAN BUS electrical signal converter; and wherein the subsea CAN BUS electronic distribution unit is further adapted to convert a high speed input signal into a low speed output signal by the high to low speed CAN BUS electrical signal converter, and to convert a low speed input signal into a high speed output signal by the low to high speed CAN BUS electrical signal converter. The subsea CAN BUS electronic distribution unit may further comprise wherein the optical CAN BUS transmitter/receiver is adapted to convert an optical input signal into an electrical output signal, and to convert an electrical input signal into an optical output signal. The housing may comprise a flying lead or a multiple connectorized distribution unit ("MCDU"). The subsea CAN BUS electronic distribution unit may further be adapted to communicate, by the output signal, with a device on a CAN BUS network. The device may be one of: a temperature sensor, a pressure sensor, a dual pressure sensor/temperature sensor, a junction box, and a subsea control module.

In another embodiment, the present invention provides a subsea CAN BUS network comprising: a subsea control module; a set of end devices; and a subsea CAN BUS electronic distribution unit comprising: a housing comprising an outer shell and an inner atmospheric chamber disposed within the outer shell adapted to withstand high temperature and pressure differentials; a set of control circuitry disposed within the inner atmospheric chamber; an optical CAN BUS transmitter/receiver disposed within the inner atmospheric chamber and connected to the set of control circuitry; an electrical CAN BUS transmitter/receiver disposed within the inner atmospheric chamber and connected to the set of control circuitry; a set of optical CAN BUS inputs and outputs connected to the optical CAN BUS transmitter/receiver; a set of electrical CAN BUS inputs and outputs connected to the electrical CAN BUS transmitter/ receiver; wherein, the subsea CAN BUS electronic distribution unit is adapted to: receive an optical input signal at the set of optical CAN BUS inputs or an electrical input signal at the set of electrical CAN BUS inputs from the subsea control module or an end device in the set of end devices; determine, by a set of instructions stored on the control circuitry, to which of the subsea control module or end device in the set of end devices to transmit an output signal; and transmit the output signal.

In the subsea CAN BUS network of the above embodiment the subsea CAN BUS electronic distribution unit may further comprise: a low to high speed CAN BUS electrical signal converter disposed within the inner atmospheric chamber and connected to the set of control circuitry; a high to low speed CAN BUS electrical signal converter disposed within the inner atmospheric chamber and connected to the set of control circuitry; a set of high speed CAN BUS electrical inputs connected to the high to low speed CAN BUS electrical signal converter; a set of low speed CAN BUS electrical inputs connected to the low to high speed CAN BUS electrical signal converter; a set of high speed CAN BUS electrical outputs connected to the low to high speed CAN BUS electrical signal converter; a set of low speed CAN BUS electrical outputs connected to the high to low speed CAN BUS electrical signal converter; and wherein the subsea CAN BUS electronic distribution unit is further adapted to convert a high speed input signal into a low speed output signal by the high to low speed CAN BUS electrical signal converter, and to convert a low speed input signal into a high speed output signal by the low to high speed CAN BUS electrical signal converter. The subsea CAN BUS electronic distribution unit may further comprise wherein the optical CAN BUS transmitter/receiver is adapted to convert an optical input signal into an electrical output signal, and to convert an electrical input signal into an optical output signal. The housing of the subsea CAN BUS electronic distribution unit may further comprise a flying lead or a multiple connectorized distribution unit ("MCDU"). The set of devices may comprise one or more of a temperature sensor, a pressure sensor, a dual pressure sensor/temperature sensor, and a junction box.

In yet another embodiment, the present invention provides a subsea CAN BUS network comprising: a set of subsea devices; and a subsea CAN BUS electronic distribution unit comprising: a housing comprising an outer shell and an inner atmospheric chamber disposed within the outer shell adapted to withstand high temperature and pressure differentials; a set of control circuitry disposed within the inner atmospheric chamber; a set of electrical CAN BUS inputs and outputs connected to the set of control circuitry; wherein, the subsea CAN BUS electronic distribution unit is adapted to: receive an electrical input signal at the set of electrical CAN BUS inputs; determine, by a set of instructions stored on the control circuitry, a routing destination for the set of electrical inputs; convert the set of electrical inputs into an output signal; transmit the output signal; and wherein the subsea CAN BUS electronic distribution unit is adapted to be connected to one or more the set of subsea devices on the subsea CAN BUS network.

The subsea CAN BUS network may further comprise a first set of high speed CAN BUS repeaters adapted to be connected to the subsea CAN BUS electronic distribution unit on a standard CAN BUS circuit; wherein each of the high speed CAN BUS repeaters in the first set of high speed CAN BUS repeaters comprises a high speed CAN BUS interface and a standard CAN BUS interface. The subsea CAN BUS network may further comprise a second set of high speed CAN BUS repeaters adapted to be connected to the first set of high speed CAN BUS repeaters on a high speed CAN BUS circuit. The subsea CAN BUS network may further comprise a first set of optical CAN BUS repeaters adapted to be connected to the subsea CAN BUS electronic distribution unit on a standard CAN BUS circuit; wherein each of the optical CAN BUS repeaters in the first set of optical CAN BUS repeaters comprises an optical transceiver and a standard CAN BUS interface. The subsea CAN BUS network may further comprise a second set of optical CAN BUS repeaters adapted to be connected to the first set of optical CAN BUS repeaters on by an optical connection. The subsea CAN BUS network may further comprise a set of subsea control modules ("SCMs") adapted to be connected to the subsea CAN BUS network on a standard CAN BUS connection. The subsea CAN BUS network may further comprise a set of sensors adapted to be connected to the subsea CAN BUS network on a standard CAN BUS connection.

Other features and advantages of the present invention should be apparent from the following description which illustrates, by way of example, aspects of the invention.

BRIEF DESCRIPTION OF THE DRAWINGS

In order to facilitate a complete understanding of the present invention, this system, and the terms used, reference is now made to the accompanying drawings, in which like elements are referenced with like numerals. These drawings should not be construed as limiting the present invention or system, but are exemplary and for reference.

DETAILED DESCRIPTION

Figure 1:
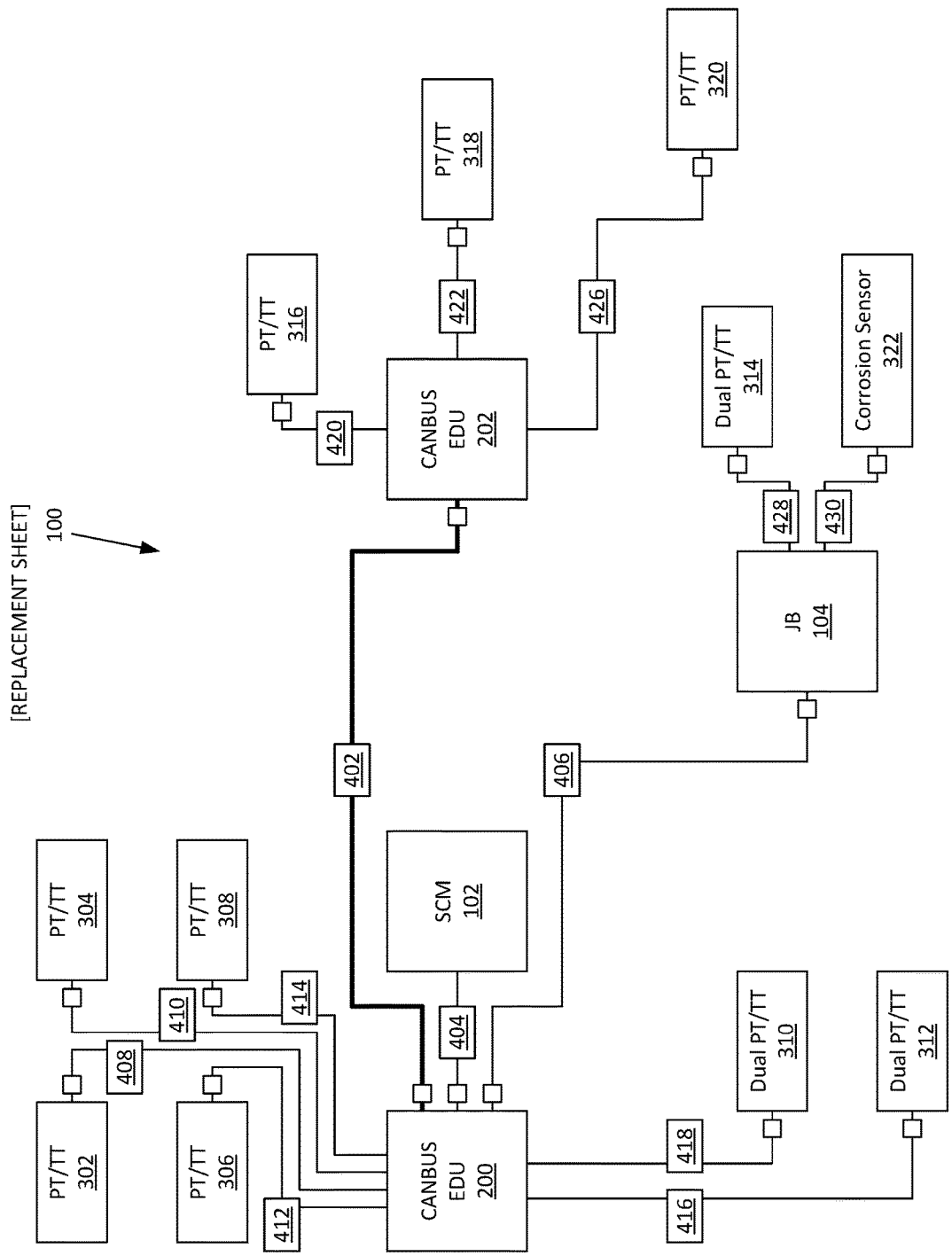
FIG. 1 is a block diagram of a subsea CAN BUS network according to one embodiment of the present invention.

The present invention and system will now be described in more detail with reference to exemplary embodiments as shown in the accompanying drawings. While the present invention and system is described herein with reference to the exemplary embodiments, it should be understood that the present invention and system is not limited to such exemplary embodiments. Those possessing ordinary skill in the art and having access to the teachings herein will recognize additional implementations, modifications, and embodiments as well as other applications for use of the invention and system, which are fully contemplated herein as within the scope of the present invention and system as disclosed and claimed herein, and with respect to which the present invention and system could be of significant utility.

The present invention provides a subsea CAN BUS electronic distribution unit that houses a set of control circuitry on a single board in a single housing. The set of control circuitry within the housing of the subsea CAN BUS electronic distribution unit may be connected to optical signal transmitter/receivers and electrical signal transmitter/receivers as well as optical to electrical signal converters, electrical to optical signal converters, high to low speed signal converters, and low to high speed signal converters. The control circuitry within the subsea CAN BUS electronic distribution unit determines the type of input signal, the destination of the signal, and then performs any necessary signal conversions before transmitting the signal on the appropriate signal output. For example, the subsea CAN BUS electronic distribution unit may receive, as an input, an optical signal from a subsea control module that is to be sent to a temperature sensor. The subsea CAN BUS electronic distribution unit determines that the temperature sensor must receive the signal on a high speed electrical line. The subsea CAN BUS electronic distribution unit then converts the optical signal to a high speed electrical signal and transmits an output signal to the temperature sensor.

Combining multiple CAN BUS signal distribution types in a single housing of the subsea CAN BUS electronic distribution unit increases the versatility of the subsea CAN BUS network. A subsea CAN BUS network may have a plurality of sensors in communication one a subsea control module, which in turn may be connected to other subsea or surface based equipment. The sensors on the subsea CAN BUS network may be single pressure sensors, single pressure/temperature sensors, single temperature sensors, dual pressure sensors, dual pressure/temperature sensors, dual temperature sensors, dual pressure single temperature sensors, or single pressure dual temperature sensors. Other sensors types suitable to be used in subsea CAN BUS network may also incorporated in the subsea CAN BUS network.

The subsea CAN BUS electronic distribution unit may also function as a signal repeater by taking an optical input signal, which typically has a maximum transmission distance of 5 kilometers, and transmitting an electrical output, which typically has a maximum transmission distance of 80 meters, thereby enabling an electrical CAN BUS device to communicate with a source, such as a subsea control module, well in excess of the typical 80 m maximum distance. The subsea CAN BUS electronic distribution unit may also be used to connect to other subsea CAN BUS electronic distribution units, enabling a large and widely dispersed subsea CAN BUS network to be set up using a single subsea control module.

Typically, a subsea control module is set up as the "master" device on a subsea CAN BUS network with all other devices as "slave" devices. However, the subsea CAN BUS electronic distribution unit may also be set up as a "master" device so that the subsea CAN BUS electronic distribution unit can distribute a signal to any desired end device. Additionally, some or all subsea control modules may be replaced with the subsea CAN BUS electronic distribution unit of the present invention, thereby greatly reducing the time and cost typically associated with setting up a subsea CAN BUS network.

With reference now to FIG. 1, a subsea CAN BUS network 100 is provided. The subsea CAN BUS network 100 comprises subsea control module ("SCM") 102; CAN BUS electronic distribution unit ("CANBUS EDU") 200; CANBUS EDU 202; junction box ("JB") 104; single pressure/temperature sensors ("PT/TT") 302, 304, 306, 308, 316, 318, and 320; dual pressure/temperature sensors ("Dual PT/TT") 310, 312, and 314; and corrosion sensor 322. The PT/TTs 302, 304, 306, and 308 and the Dual PT/TTs 310 and 310 are in electrical communication with the CANBUS EDU 200 over high speed electrical lines 408, 410, 412, 414, 416, and 418 respectively. CANBUS EDU 200 is connected to the SCM 102 by optical connection 404 and to the CANBUS EDU 202 by optical connection 402. CANBUS EDU 200 is also connected to JB 104 by high speed electrical line 406. JB 104 is connected to Dual PT/TT 314 and APD 322 by high speed electrical lines 428 and 430 respectively. CANBUS EDU 202 is connected to PT/TTs 316, 318, and 320 by high speed electrical lines 420, 422, and 426 respectively.

In this embodiment, subsea CAN BUS network 100 has SCM 102 connected to the CANBUS EDU 200. The CANBUS EDU 200 functions as a distribution hub for all devices on the subsea CAN BUS network 100. The CANBUS EDU 200 is also acting as a range extender or repeater by sending signals to the CANBUS EDU 202 and JB 104 which are connected to the SCM 102 through the CANBUS EDU 200. In other embodiments, SCM 102 may not be needed and the CANBUS EDU 200 may take over the functionality typically provided by the SCM 102.

Using multiple CANBUS EDUs enables the subsea CAN BUS network 100 to be distributed or dispersed over a much larger area than would typically be provided by a single SCM 102. For example, CANBUS EDU 200 may be as far as 5 km away from the SCM 102 when connected by the optical connection 404. Additionally, CANBUS EDU 202 may be as far as 5 km from CANBUS EDU 200, or a total of approximately 10 km from SCM 102, a distance that would be impossible on a purely electrical CAN BUS network.

CANBUS EDU 200 is connected to a plurality of subsea sensors. These sensors are all connected to CANBUS EDU 200 by high speed electrical lines, but may also be connected by low speed electrical lines, depending on the sensor type. These sensors must be within approximately 200 m of the CANBUS EDU 200 or the electrical signals will degrade to the point that they are non-usable. For devices that must be more than 200 m from CANBUS EDU 200, an optical connection, such as optical connection 402, may be used to connect CANBUS EDU 200 to another CANBUS EDU 202. This configuration enables PT/TTs 316, 318, and 320 to be placed well beyond the typical 200 m limit from CANBUS EDU 200.

Using multiple CANBUS EDUs enables the subsea CAN BUS network to easily and flexibly be spread over a large subsea area, connecting sensors together that are multiple kilometers from a control module or surface umbilical termination.

Figure 2:
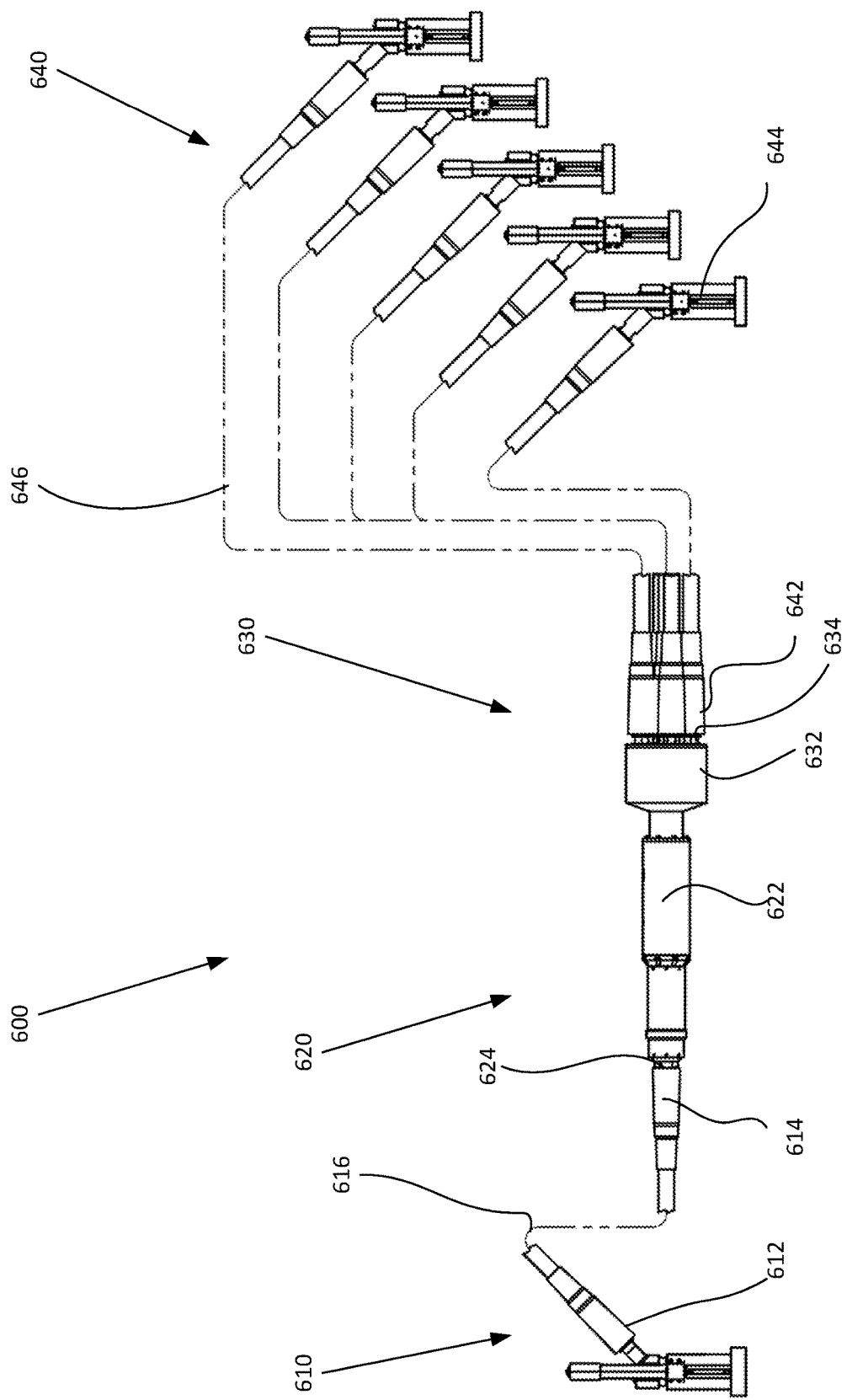
FIG. 2 is a diagram of a flying lead harness CAN BUS electronic distribution unit according to another embodiment of the present invention.

With reference now to FIG. 2, a side view of CANBUS EDU flying lead harness 600 connecting an optical input cable 610 to five electrical output cables 640 is provided. The electrical output cables 640 may be high speed or low speed electrical cables. The first end 612 of the optical input cable 610 connects to a source device such as an SCM. An optical cable 616, which may be a single mode optical fiber or a hybrid electro-optical cable, joins the first end 612 to the second end 614. The first end 612 and second end 614 of the optical cable 610 as well as the first end 642 and second end 644 of the electrical cable 640, may be any suitable releasable wet-mate or dry-mate connector capable of functioning in a subsea environment and capable of withstanding high pressure and temperature differentials. The second end 614 of the optical cable 610 connects to the electro-optical input/output port 624. The electro-optical input/output port 624 is at one end of the housing 620. The housing 620 may comprise an atmospheric chamber 622 housing the control circuitry of the CANBUS EDU 600. A cable breakout 632 of the electrical distribution box 630 may comprise the set of high speed or low speed electrical input/outputs. Each cable 640 in the set of electrical cables 640 connects to an electrical input/output junction 634 at the first end 642 of the electrical cable 640. An electrical wire 646 joins the first end 642 to the second end 644 of the electrical cable and may connect to an end device such as a sensor.

Figure 3:
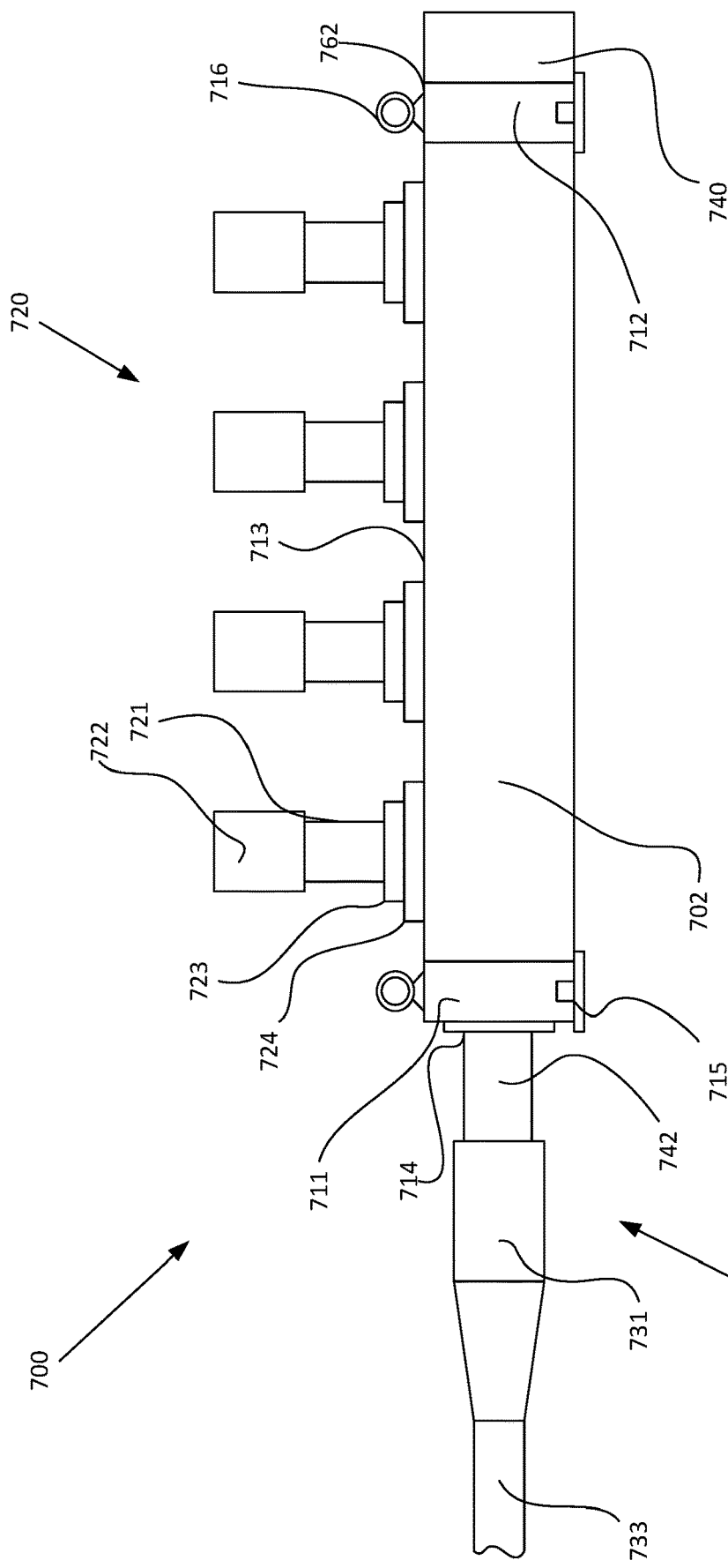
FIG. 3 is a diagram of an MCDU housing CAN BUS electronic distribution unit according to yet another embodiment of the present invention.

With reference now to FIG. 3, a side view of an embodiment of a CANBUS EDU 700 in an MCDU housing 720 having an optical input port 742 and a plurality of electrical output ports 722 is provided. The MCDU housing 720 may comprise first frame end 711 and second frame end 712 and have a body 702 and a top 713. Rings 716 with ring bases 762 may be used to secure the first frame end 711 and second frame end 712 to the body 702 or to move and maneuver the MCDU housing 720. A set of mounting points 715 may be used to secure the MCDU housing 720 to a larger structure or supporting surface. An optical cable 730 having a cable 733 and connection end 731 is adapted to connect to the optical input port 742. A collar 714 forms a seal between the optical input port 742 and the body 702 of the MCDU housing 720. Each optical input port 722 has a body 721, base 723, and seal 724 and is disposed on the top 713 of the body 702 of the MCDU housing 720. A circuit housing 740 may be disposed on the end of the body 702 of the MCDU housing 720 and may comprise an atmospheric chamber holding the control circuitry of the CANBUS EDU 700.

In either the configuration shown in FIG. 2 or in FIG. 3, the CANBUS EDU of the present invention is a small, compact, self contained device that may be easily installed in a subsea communications network without the use of a crane or other large surface equipment. Both configurations are installable by a diver or by an ROV and do not require heavy machinery or equipment to connect and place. The small size and easy installation of the CANBUS EDU of the present invention provides for cost and time savings over the large SCMs. In either configuration, the CANBUS EDU may comprise optical transmitter/receivers, high speed electrical transmitter/receivers, low speed electrical transmitter/receivers, low to high speed electrical signal converters, and high to low speed electrical signal converters. The control circuitry may incorporate some or all of these components and is shown, for example, as control circuitry 803 in FIG. 4. The control circuitry may also comprise a processor and a memory with instructions configured to cause the CANBUS EDU to determine what type of input signal is received, what device is to receive the signal, and if any signal conversion is required. For example, the CANBUS EDU may determine if an optical input signal needs to be converted to a high speed or low speed electrical output signal and also determines to which device the signal needs to be sent. The CANBUS EDU routes the converted signal to the proper output for transmission to the appropriate determined device. The CANBUS EDU may also take an input signal, such as an optical input signal, and route the signal to an optical output for transmission to a device over an optical connection.

Figure 4:
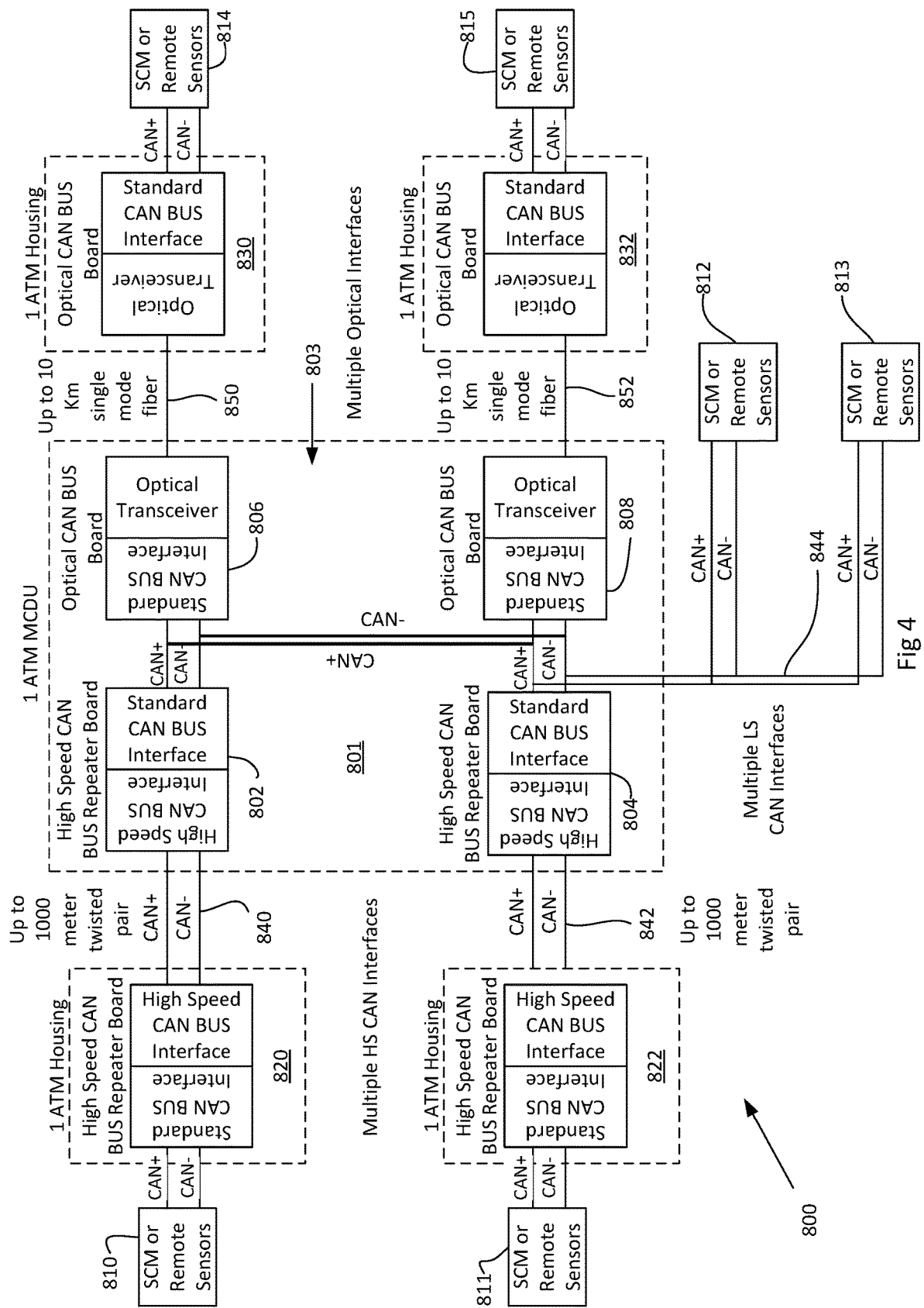
FIG. 4 is a block diagram of a subsea CAN BUS network according to another embodiment of the invention.
Figure 5:
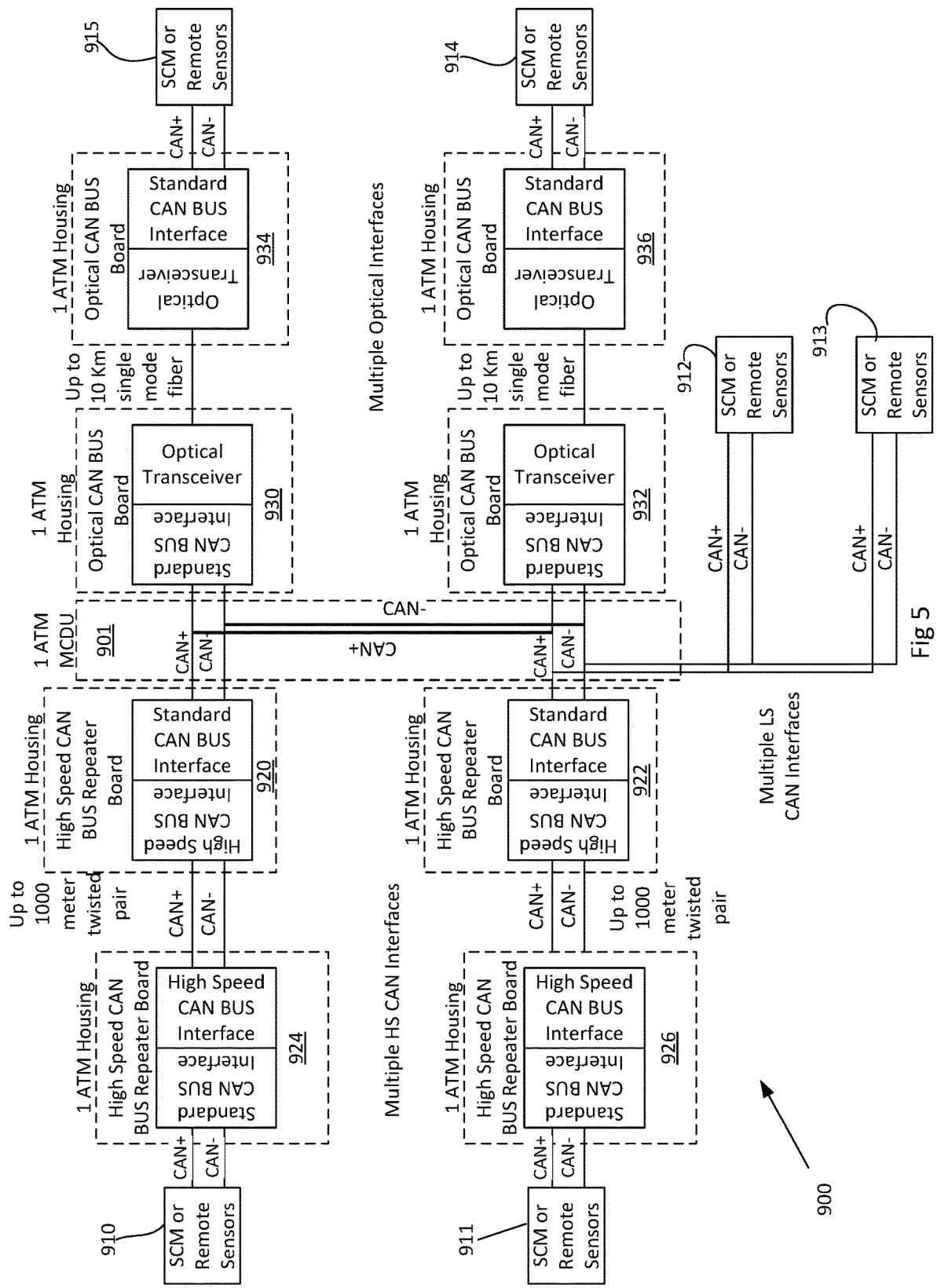
FIG. 5 is a block diagram of a subsea CAN BUS network according to another embodiment of the invention.

With reference now to FIGS. 4 and 5, block diagrams of CAN BUS networks according to the present invention are provided. In FIG. 4 the subsea CAN BUS system 800 comprises an MCDU 801 that houses within a single atmospheric housing a first high speed CAN BUS repeater board 802, a second high speed can bus repeater board 804, a first optical CAN BUS board 806, and a second optical CAN BUS board 808, which comprise the control circuitry 803. Each of the first high speed CAN BUS repeater board 802, the second high speed can bus repeater board 804, the first optical CAN BUS board 806, and the second optical CAN BUS board 808 comprise the control circuitry 803 and are interconnected such that signals may be transmitted from any one of the boards to any other of the boards. For example, an input signal at the first high speed CAN BUS repeater board 802 may be output as an output signal from the second optical CAN BUS board 808. Furthermore, both the first high speed CAN BUS repeater board 802 and the second high speed can bus repeater board 804 comprise a high speed CAN BUS interface and a standard CAN BUS interface. The high speed CAN BUS interface is configured to communicate with other subsea devices over a high speed CAN BUS connection and the standard, or low speed, CAN BUS interface may be used to communicate with other boards in the MCDU 801 or with other standard speed CAN BUS devices connected to the MCDU 801. The first optical CAN BUS board 806 and the second optical CAN BUS board 808 each comprise a standard CAN BUS interface and an optical transceiver.

The CAN BUS system 800 also comprises a first CAN BUS repeater 820, a second CAN BUS repeater 822, a first optical CAN BUS repeater 830, a second optical CAN BUS repeater 832, and a set of SCMs or sensors 810, 811, 812, 813, 814, and 815. Each of the first CAN BUS repeater 820, the second CAN BUS repeater 822, the first optical CAN BUS repeater 830, and the second optical CAN BUS repeater 832 are enclosed within their own separate atmospheric housings with a set of inputs and a set of outputs. Each of the set of SCMs or sensors 810, 811, 812, 813, 814, and 815 is connected to one of the first CAN BUS repeater 820, the second CAN BUS repeater 822, the first optical CAN BUS repeater 830, the second optical CAN BUS repeater 832, or the MCDU 801 by a standard CAN BUS connection. The first CAN BUS repeater 820 and the second CAN BUS repeater 822 each comprise a high speed CAN BUS interface and a standard CAN BUS interface and are connected to the high speed CAN BUS interface of the first high speed CAN BUS repeater board 802 and the second high speed CAN BUS repeater board 804 by the twisted pair 840 and twisted pair 842 respectively. The first optical CAN BUS repeater 830 and the second optical CAN BUS repeater 832 each comprise an optical transceiver and a standard CAN BUS interface and are connected to the optical transceiver of the first optical CAN BUS board 806 and the second optical CAN BUS board 808 by the single mode optical fiber 850 and single mode optical fiber 852 respectively.

The CAN BUS system 900 in FIG. 5 is similar to the system provided in FIG. 4, however, the system 900 in FIG. 5 is a more modular and flexible design than the system provided in FIG. 4. For example, the system 900 comprises an MCDU 901 that has a set of CAN BUS inputs and outputs. However, unlike the MDCU 801 in FIG. 4, the MCDU 901 in FIG. 5 does not house CAN BUS repeater boards or optical CAN BUS Boards. In the system 900 a first high speed CAN BUS repeater 920 and a second CAN BUS repeater 922, and a first optical CAN BUS repeater 930 and a second optical CAN BUS repeater 932 are connected to and in communication with the MCDU 901, but are not enclosed within the atmospheric housing of the MCDU 901. Each of the first high speed CAN BUS repeater 920, the second CAN BUS repeater 922, the first optical CAN BUS repeater 930, and the second optical CAN BUS repeater 932 are enclosed in separate, individual atmospheric housings having a set of inputs and outputs which may be CAN BUS connections or optical connections. The system 900 further comprises a set of SCMs or sensors 910, 911, 912, 913, 914, and 915 connected to either the MCDU 901 or to one of a third high speed CAN BUS repeater 924, a fourth high speed CAN BUS repeater 926, a third optical CAN BUS repeater 934, or a fourth optical CAN BUS repeater 936 by a standard CAN BUS twisted pair connection. The third high speed CAN BUS repeater 924 and the fourth high speed CAN BUS repeater 926 are connected to the first high speed CAN BUS repeater 920 and the second CAN BUS repeater 922 respectively by a set of high speed CAN BUS twisted pair connections. The third optical CAN BUS repeater 934 and the fourth optical CAN BUS repeater 936 are connected to the first optical CAN BUS repeater 930 and the second optical CAN BUS repeater 932 by an optical single mode fiber.

The system 900 provides for additional customization of the system 900 over the system 800 shown in FIG. 4. The MCDU 901 comprises a plurality of low or standard speed CAN BUS interfaces and may be connected directly to an SCM or sensor, to a high speed CAN BUS repeater, or to an optical CAN BUS repeater. The increased flexibility enables the MDCU 901 to be used in a wider range of applications and subsea CAN BUS network types than the MCDU 801. The MCDU 901 can be connected to only a set of SCMs or sensors, only to a set of high speed CAN BUS repeaters, only to a set of optical CAN BUS repeaters, or to any combination of SCMs, sensors, high speed CAN BUS repeaters, or optical CAN BUS repeaters. The interchangeability afforded by the more flexible design of the MCDU 901 makes the system easily reconfigurable for different or changing applications. The MCDU 901 also provides for easy service and repair of subsea CAN BUS network components by enabling any component to be "swapped out" in the event that service needs to be performed. The system can also be more easily adapted to changing network needs.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A subsea CAN BUS electronic distribution unit comprising:
a housing adapted to be secured to a supporting surface by a remote operated vehicle ("ROV") and comprising an outer shell and an inner atmospheric chamber disposed within the outer shell adapted to withstand high temperature and pressure differentials, and comprising a plurality of wet-matable connectors;
at least one optical CAN BUS transmitter/receiver disposed within the housing and comprising at least one optical CAN BUS input/output port and a standard CAN BUS interface and connected to one of the plurality of wet-matable connectors;
at least one electrical CAN BUS transmitter/receiver disposed within the housing and comprising at least one electrical CAN BUS input/output port and connected to one of the plurality of wet-matable connectors;
wherein the electrical CAN BUS transmitter/receiver is in electrical communication with the optical CAN BUS transmitter/receiver;
wherein, the subsea CAN BUS electronic distribution unit is adapted to:
receive an optical input signal at the at least one optical CAN BUS input/output port or receive an electrical input signal at the at least one electrical CAN BUS input/output port;
generate a signal derived from the received input signal;
generate an output signal at one of the at least one optical CAN BUS transmitter/receiver or the at least one electrical CAN BUS transmitter/receiver; and
transmit the output signal to a first device external to the CAN BUS electronic distribution unit.

2. The subsea CAN BUS electronic distribution unit of claim 1, wherein the subsea CAN BUS electronic distribution unit is further adapted to convert a high speed input signal into a low speed output signal and to convert a low speed input signal into a high speed output signal by the electrical CAN BUS transmitter/receiver.

3. The subsea CAN BUS electronic distribution unit of claim 1, wherein the housing comprises a flying lead.

4. The subsea CAN BUS electronic distribution unit of claim 1, wherein the housing comprises a multiple connectorized distribution unit ("MCDU").

5. The subsea CAN BUS electronic distribution unit of claim 1, wherein the subsea CAN BUS electronic distribution unit is further adapted to communicate, by the output signal, with a second device on a CAN BUS network.

6. The subsea CAN BUS electronic distribution unit of claim 5, wherein the first device and the second device are selected from the group consisting of: a temperature sensor, a pressure sensor, a dual pressure sensor/temperature sensor, a junction box, and a subsea control module.

7. A subsea CAN BUS network comprising:
a subsea control module;
a set of end devices; and
a subsea CAN BUS electronic distribution unit comprising:
a housing adapted to be secured to a supporting surface by a remote operated vehicle (ROV) and comprising an outer shell and an inner atmospheric chamber disposed within the outer shell adapted to withstand high temperature and pressure differentials, and comprising a plurality of wet-matable connectors;
at least one optical CAN BUS transmitter/receiver disposed within the housing and comprising at least one optical CAN BUS input/output port and a standard CAN BUS interface and connected to one of the plurality of wet-matable connectors;
at least one electrical CAN BUS transmitter/receiver disposed within the housing and comprising at least one electrical CAN BUS input/output port and connected to one of the plurality of wet-matable connectors;
wherein the electrical CAN BUS transmitter/receiver is in electrical communication with the optical CAN BUS transmitter/receiver;
wherein, the subsea CAN BUS electronic distribution unit is adapted to:
receive an optical input signal at the at least one optical CAN BUS input/output port or receive an electrical input signal at the at least one electrical CAN BUS input/output port from the subsea control module or an end device in the set of end devices;

generate a signal derived from the received input signal;

generate an output signal at one of the at least one optical CAN BUS transmitter/receiver or the at least one electrical CAN BUS transmitter/receiver; and transmit the output signal to the subsea control module or end device in the set of end devices.

8. The subsea CAN BUS network of claim 7, wherein the subsea CAN BUS electronic distribution unit is further adapted to convert a high speed input signal into a low speed output signal and to convert a low speed input signal into a high speed output signal by the electrical CAN BUS transmitter/receiver.

9. The subsea CAN BUS network of claim 7, wherein the housing of the subsea CAN BUS electronic distribution unit further comprises a flying lead.

10. The subsea CAN BUS network of claim 7, wherein the housing of the subsea CAN BUS electronic distribution unit further comprises a multiple connectorized distribution unit ("MCDU").

11. The subsea CAN BUS network of claim 7, wherein the set of devices comprises one or more of a temperature sensor, a pressure sensor, a dual pressure sensor/temperature sensor, and a junction box.

12. A subsea CAN BUS network comprising:
a set of subsea devices; and
a subsea CAN BUS electronic distribution unit comprising:
a housing adapted to be secured to a supporting surface by a remotely operated vehicle ("ROV") and comprising an outer shell and an inner atmospheric chamber disposed within the outer shell adapted to withstand high temperature and pressure differentials, and comprising a plurality of wet-mateable connectors;
at least one optical CAN BUS transmitter/receiver disposed within the housing and comprising at least one optical CAN BUS input/output port and a standard CAN BUS interface and connected to one of the plurality of wet-mateable connectors;
at least one electrical CAN BUS transmitter/receiver disposed within the housing and comprising at least one electrical CAN BUS input/output port and connected to one of the plurality of wet-mateable connectors;
wherein the electrical CAN BUS transmitter/receiver is in electrical communication with the optical CAN BUS transmitter/receiver;
wherein, the subsea CAN BUS electronic distribution unit is adapted to:
receive an optical input signal at the at least one optical CAN BUS input/output port or receive an electrical input signal at the at least one electrical CAN BUS input/output port;
generate a signal derived from the received input signal;
generate an output signal at one of the at least one optical CAN BUS transmitter/receiver or the at least one electrical CAN BUS transmitter/receiver;
transmit the output signal to one of the subsea devices in the set of subsea devices; and
wherein the subsea CAN BUS electronic distribution unit is adapted to be connected to one or more of the set of subsea devices on the subsea CAN BUS network.

13. The subsea CAN BUS network of claim 12, further comprising: a first set of high speed CAN BUS repeaters adapted to be connected to the subsea CAN BUS electronic distribution unit on a standard CAN BUS circuit;
wherein each of the high speed CAN BUS repeaters in the first set of high speed CAN BUS repeaters comprises a high speed CAN BUS interface and a standard CAN BUS interface.

14. The subsea CAN BUS network of claim 13, further comprising a second set of high speed CAN BUS repeaters adapted to be connected to the first set of high speed CAN BUS repeaters on a high speed CAN BUS circuit.

15. The subsea CAN BUS network of claim 12, further comprising: a first set of optical CAN BUS repeaters adapted to be connected to the subsea CAN BUS electronic distribution unit on a standard CAN BUS circuit;
wherein each of the optical CAN BUS repeaters in the first set of optical CAN BUS repeaters comprises an optical transceiver and a standard CAN BUS interface.

16. The subsea CAN BUS network of claim 15, further comprising a second set of optical CAN BUS repeaters adapted to be connected to the first set of optical CAN BUS repeaters on by an optical connection.

17. The subsea CAN BUS network of claim 12, further comprising a subsea control module ("SCM") adapted to be connected to the subsea CAN BUS network on a standard CAN BUS connection.

18. The subsea CAN BUS network of claim 12, further comprising a set of sensors adapted to be connected to the subsea CAN BUS network on a standard CAN BUS connection.

* * * * *